United States Patent [19]

Gould

[11] 4,200,230

[45] Apr. 29, 1980

[54] SWIMMING POOL CLEANING HEAD

[76] Inventor: Henry D. Gould, 7734 N. 41st Ave., Phoenix, Ariz. 85021

[21] Appl. No.: 21,095

[22] Filed: Mar. 16, 1979

[51] Int. Cl.[2] .............................................. A01G 25/02

[52] U.S. Cl. ...................................... 239/66; 137/119; 137/624.18; 137/624.14; 239/99

[58] Field of Search ..................... 239/93, 99, 66, 563; 137/119, 624.18, 624.14; 4/191, 196

[56] References Cited

U.S. PATENT DOCUMENTS

| | | | |
|---|---|---|---|
| 3,408,006 | 10/1968 | Stanwood | 239/66 |
| 3,480,034 | 11/1969 | Jerome | 239/66 X |
| 4,086,933 | 5/1978 | Pansini | 239/66 X |

*Primary Examiner*—Joseph E. Valenza
*Assistant Examiner*—Gene A. Church
*Attorney, Agent, or Firm*—Cahill, Sutton & Thomas

[57] ABSTRACT

A cleaning head system for use on the bottom of swimming pools includes a rotating nozzle opening formed by a curved elastic strip disposed in an annular region formed by substantially coextensive annular grooves, the elastic strip having concentric inner and outer edges, respectively. Water forced at high pressure into the annular region past the inner edges forces the elastic strip against the respective outer edges. The distance between the first and second ends of the elastic strip forms the nozzle opening through which a high velocity stream of water is forced. A plurality of stops are disposed in spaced relationship along the inner edges. The first end of the elastic strip has a tab for engaging the stops when water pressure is released, as the curvature of the elastic strip causes it to relax, forcing the first end inwardly against the inner edges. The continued action of the relaxing of the elastic strip and the engaging of the first end cause the second end to advance. When the water is repressurized, the second end engages the outer edges of the annular grooves, causing the first end to also advance with respect to the outer edges.

9 Claims, 8 Drawing Figures

SWIMMING POOL CLEANING HEAD

BACKGROUND OF THE INVENTION

1. Field of the Invention The invention relates to cleaning heads for use in bottoms of swimming pools, and more particularly, to cleaning heads having nozzles which automatically rotate as water pressure is cycled on and off.

2. Description of the Prior Art

A variety of automatic pool cleaning systems have been devised to ease the task of keeping swimming pool surfaces free of settled debris. Some known systems utilize a plurality of "cleaning heads" disposed along bottom surfaces of swimming pools, the cleaning heads having nozzles which expell high velocity streams of water along the bottom surfaces of the pools to loosen settled debris from the bottom surfaces and mixing the debris with water immediately adjacent the pool surfaces. Such nozzles slowly rotate, so that the high velocity water streams radially rotate around the cleaning heads. The loosened debris can then be easily advanced toward a drain located in the deepest portion of the swimming pool and be drawn into a filtering system which removes the debris from the water.

One type of pool cleaning head of the type described above is disclosed in U.S. Pat. No. 3,408,006. However, that device is unduly large, complex, and expensive to manufacture. It includes a housing having two inner spaced rings of sawtooth-like teeth disposed along a cylindrical opening through the housing. A rotating head containing the nozzle has a pair of pins which extend outwardly into spaces between the teeth in the two rows. High pressure water forced into the cleaning head causes the rotating head and the pins to be raised. The pin engages sloped portions of the teeth of the upper row, causing the rotating head to rotate. When the water pressure is released, the head falls, causing the pins to engage sloped portion of teeth of the lower row, further rotating the rotating head and thereby further rotating the nozzle. As the water pressure is cycled on and off, the nozzle gradually rotates through a complete cycle. The device of U.S. Pat. No. 3,408,006 has a number of shortcomings; for example, it is 18" in height. The cost of providing receptacles in the bottom of a swimming pool to accommodate such large devices is unduly high. Further, since the entire rotating head is raised and lowered in response to cycling of water pressure, the device is unduly susceptible to inoperativeness caused by small rocks and other debris becoming stuck between the surrounding housing and the rotating head.

Accordingly, it is an object of the invention to provide a cleaning head having a very simple mechanism for rotating a high pressure water nozzle.

Another object of the invention is to provide a cleaning head which is substantially smaller than the cleaning heads of the prior art.

Still another object of the invention is to provide a swimming pool cleaning head which is not susceptible to having its operation interfered with by debris in a swimming pool.

Not only is the pool cleaning head disclosed in U.S. Pat. No. 3,408,006 unduly large and complex, its expense is increased by its difficulty of manufacture. The difficulty of manufacture results from the fact that it is not practical to produce the housing as a single unit by injection molding techniques because of the configuration of the above described two rings of teeth which must be formed within the housing. Hence, the housing must be formed from at least two injection molded parts which then must be fused or cemented together. Further, the stainless steel pins must be installed in the rotating head portion of the device so that the stainless steel pins extend between the space between the upper and lower rings of sawtooth-like teeth.

Accordingly, it is yet another object of the invention to provide a pool cleaning head system which can be manufactured and assembled without having to fuse or cement separately injection molded parts together.

Yet still another object of the invention is to provide a pool cleaning system which overcomes the above described shortcomings of the prior art.

SUMMARY OF THE INVENTION

Briefly described, and in accordance with one embodiment thereof, a cleaning head system for use in cleaning a swimming pool includes a base unit which can be inserted into a receptacle disposed in the bottom of the swimming pool. A support element is attached to the base. A cylindrical opening through the base extends through the support element. A first annular groove surrounding the first opening is disposed in the surface of the support element. The first annular groove has concentric inner and outer edges. A plurality of protruding stops extending from the surface of the support element are positioned adjacent the inner edge of the first annular groove. A top plate having a second annular groove of substantially the same dimensions as the first annular groove and aligned therewith is supported above the support element. An elastic plastic strip having a curved, relaxed configuration, wherein the curvature of radius of the elastic strip decreases from the first and second ends and also is positioned in the annular region bounded by the first and second annular grooves. When water is forced through the opening, the elastic strip is forced outward against the outer boundaries of the first and second annular grooves. The length of the elastic strip is such that its first and second ends are spaced by a distance equal to the desired nozzle opening width of the cleaning head system, thereby forcing a nozzle opening through which a high velocity stream of water is ejected. A small tab is disposed on the inner edge of the first end of the elastic strip. The curvature of the elastic strip is such that when the water pressure is relieved, the first end of the plastic strip contracts inwardly to contact the inner edges of the first and second grooves as the elastic strip relaxes to its relaxed configuration. The curvature of the elastic strip is such that the first end slides along the inner edges of the first and second grooves until the tab engages one of the stops. Further relaxation of the elastic strip causes the second end to advance along the outer edges of the first and second annular grooves toward the initial location of the first end. Repressurizing of the water causes the second end to engage the outer edges of the first and second annular grooves, preventing slipping of the second end, and also causes the first end to advance to a further point along the outer edges, whereby the nozzle opening between the first and second ends is rotationally advanced with respect to its initial position.

DESCRIPTION OF THE INVENTION

Figure 1:
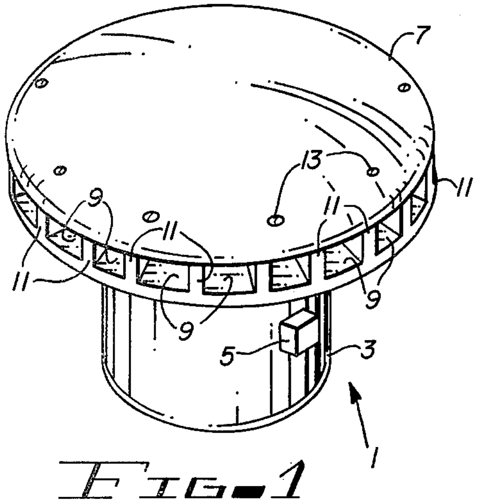
FIG. 1 is a perspective view of the cleaning head system of the present invention.

Referring now to the drawings, and particularly to FIG. 1, cleaning head system 1 includes a cylindrical base 3 having a pair of opposed rectangular tabs extending therefrom. A disc-shaped platform or support element 15 is concentric with and attached to the top of the cylindrical base 3. A disc-shaped top 7 of the same diameter as platform 15 is supported in parallel spaced relationship above platform 15, and is concentrically aligned with platform 15. A plurality of equal sized nozzle openings 9 are uniformly spaced around the perimeter of platform 15. Each nozzle opening 9 is bounded by a portion of the undersurface of top 7, the upper surface 15A of platform 15, and a pair of vertical partitions 11. Top 7 is supported by the respective partitions 11, and is attached to the underlying structure by means of a plurality of screws 13.

Figure 2:
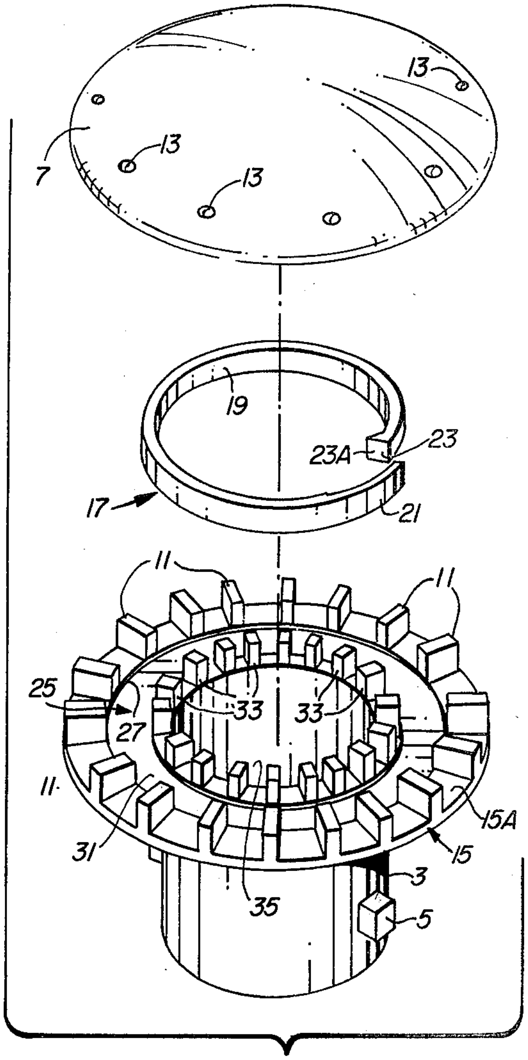
FIG. 2 is an exploded view of the pool cleaning system of FIG. 1.
Figure 3:
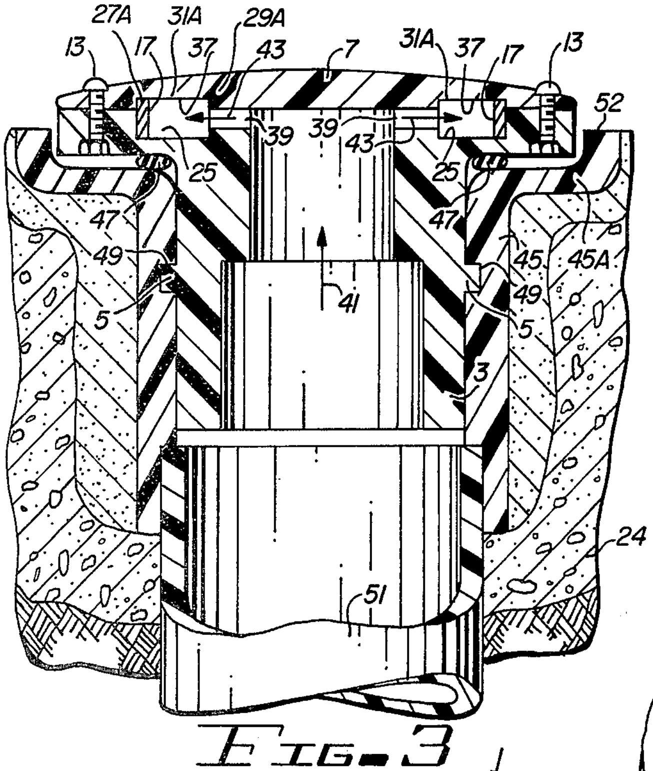
FIG. 3 is a sectional view of the cleaning head of FIG. 1 installed in a receptacle in the bottom of a swimming pool.

Referring now to FIGS. 2 and 3, it can be seen that cylindrical base 3 has a cylindrical passage 35 which extends through cylindrical base 3 and platform 15. Platform 15 includes an annular groove 25 concentrically disposed in the upper surface of platform 15 and concentrically aligned with center passage 35. Annular groove 25 has a bottom surface 31, an outer edge 27, and an inner edge 29.

Referring now particularly to FIG. 3, top 7 also has an annular groove 37. Annular groove 37 has an upper surface 31A, an inner edge 29A, and an outer edge 27A. The respective diameters of inner edge 29A and outer edge 27A are equal to the corresponding diameters of inner edge 39 and outer edge 27 of annular groove 25.

A plurality (eighteen in the described embodiment of the invention) of uniformly spaced stops 33 are positioned along inner edge 29 of annular groove 25 on the upper surface 15A of platform 15. As subsequently explained, stops 33 are engaged by a small tab 23 on the first end of flexible ring 17 as water pressure in central passage 35 is cycled on and off.

Referring to both FIGS. 2 and 3, the plurality of partitions 11 are uniformly disposed along outer edge 27 on the upper surface of platform 15. The undersurface of top 7 is supported by the upper surfaces of nozzle partitions 11 and stops 33.

Figure 4:
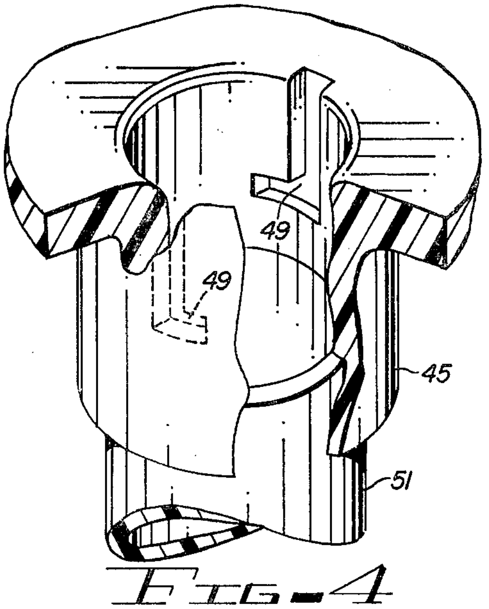
FIG. 4 is a partial perspective view of the lower portion of the receptacle of FIG. 3 into which the cleaning head of FIG. 1 fits.

Referring now to FIG. 3, it can be seen that base 3 of cleaning head assembly 1 fits into a cylindrical receptacle 45 disposed in the concrete 24 of the bottom of a swimming pool. Receptacle 45 has an upper flange 45A contoured to accommodate the portion of platform 15 which extends outwardly from the outer walls of base 3. Receptacle 45 has a pair of twist lock grooves 49 into which tabs 5 are inserted to securely fasten cleaning head assembly 1 into receptacle 45. Twist lock grooves 49 are clearly shown in FIG. 4, which shows the cylindrical body portion of receptacle 45.

Twist lock slots 49 and tabs 5 are positioned so that when cleaning head assembly 1 is locked into position in receptacle 45, the upper surface 15A of platform 15 is flush with the bottom surface 52 of the swimming pool. Thus, a high pressure, high velocity water jet expelled through one of nozzle 9 (FIG. 1) shoots outwardly across the adjacent portion of bottom surface 52, loosening debris therefrom.

A water pipe 51 extending through earth 26 is sealably engaged to the lower end of receptacle 45 so high pressure water forced through pipe 51 flows through central passage 35 in the direction indicated by arrow 41 in FIG. 3. The high pressure water than tends to flow outwardly from central passage 35 into the annular region bounded by annular grooves 25 and 37, as indicated by arrows 43.

Referring now to both FIGS. 2 and 3, elastic ring or strip 17 is disposed in the region bounded by annular grooves 25 and 37.

Figure 5:
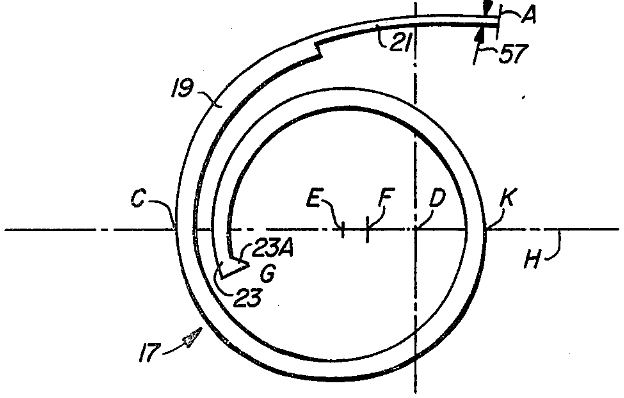
FIG. 5 is a diagram illustrating the curvature of the elastic strip shown in FIG. 2 in its relaxed configuration.
Figure 6A:
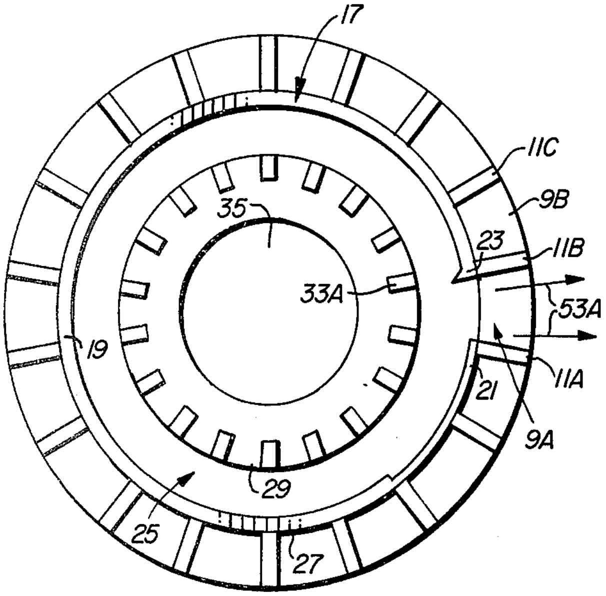
FIGS. 6A–6C are diagrams useful in explaining the contraction and expansion of the elastic strip of FIG. 2 caused by cycling of the water pressure in the cleaning head system of FIG. 1, causing rotation of the nozzle opening of the cleaning head system.

Referring now to both FIGS. 2 and 5, elastic ring 17 includes a main body portion 19, a trailing end 23 having a small inner tab 23A attached thereto, and a leading edge 21. The elastic ring 17 can be made from acetal plastic, which is a spring plastic material manufactured, for example, under the trademark DELRIN by DuPont Corporation. For the described embodiment of the invention, the completely relaxed configuration of elastic ring 17 is as shown in FIG. 5. Elastic ring 17 fits loosely in the annular region bounded by annular grooves 25 and 37, so that when high pressure water is forced into the annular region, as indicated by arrows 41 and 43 in FIG. 3, the water pressure forces elastic ring 17 against the outer edges 27 and 27A, as shown in FIG. 6A. The length of elastic ring 17 is such that the distance between first end 23 and second end 21 is approximately equal to the width of the nozzle openings 9. Thus, the effective width of the nozzle aperture of cleaning head system 1 is defined by the length of elastic ring 17 and the height of the nozzle openings is determined by the spacing between the facing inner surfaces of top 7 and platform 15.

Figure 6B:
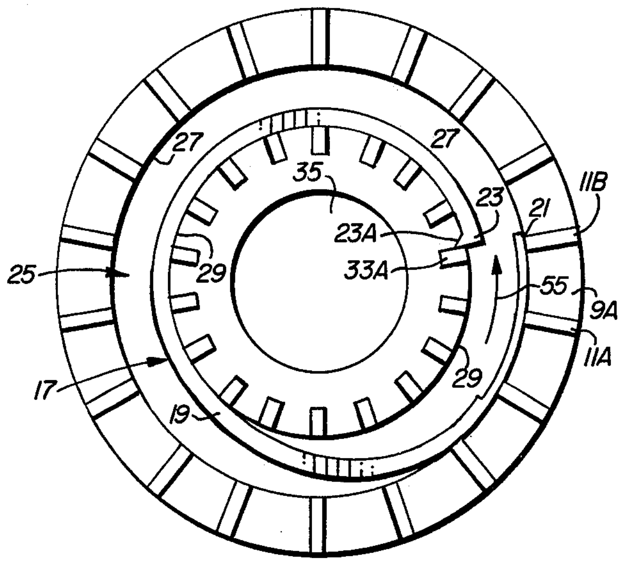
Figure 6C:
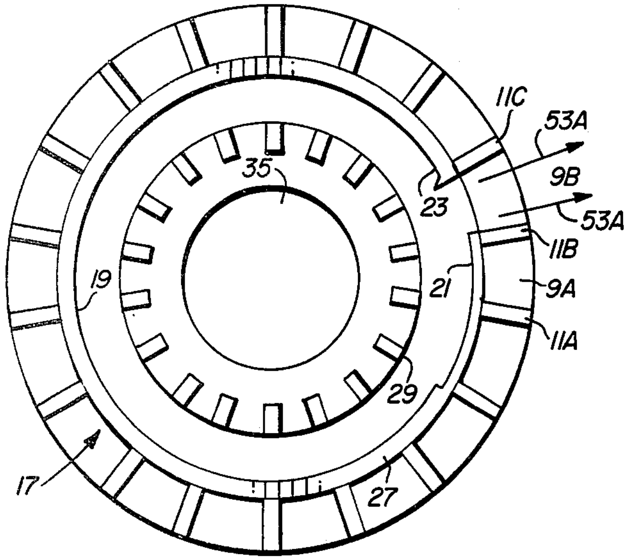

The operation of the system, whereby the high velocity water jet forced through the nozzle opening defined by the distance between ends 23 and 21 of expanded elastic ring 17 rotates radially around cleaning head system 1 as water pressure is cycled on and off, is best understood with reference to FIGS. 6A–6C.

As shown in FIG. 6A, the configuration of elastic ring 17 is such that high pressure water being forced through central passage 35 is forced outward through nozzle opening 9A, as indicated by arrow 53A. It should be noted that first end 23 is approximately aligned with partition 11B, ane end 21 of elastic ring 17 is approximately aligned with partition 11A. The following description with reference to FIGS. 6B and 6C shows how end 23 becomes aligned with partition 11C and end 21 becomes aligned with partition 11B, causing the high pressure water jet to be advanced from nozzle opening 9A to nozzle opening 9B as water pressure is cycled from the high pressure condition of FIG. 6A to a zero pressure configuration as shown in FIG. 6B back to a second high pressure condition in FIG. 6C.

Referring now to FIG. 6B, the water pressure in central passage 35 has been reduced to zero. Elastic spring 17 then tries to return to its relaxed configuration, as shown in FIG. 5. Accordingly, end 23 springs from outer edge 27 toward inner edge 29 and begins sliding in the clockwise direction along inner edge 29 until tab 23A engages stop 33A. At this point, movement of end 23 along inner edge 29 is halted. However, elastic ring 17 continues its relaxation to the greatest extent possible toward the configuration shown in FIG. 5. This causes end 21 to advance in the counterclockwise direction along outer edge 27, as indicated by arrow 55. Thus, end 21 advances from its initial position at nozzle boundary 11A to a new position approximately aligned with adjacent nozzle partition 11B when the water pressure is turned off.

Referring now to FIG. 6C, when the water pressure in central passage 35 is again turned on, elastic ring 17 is again forced outward so that the entire length of elastic ring 17 is pressed against outer edge 27. Thus, end 23 becomes aligned with nozzle partition 11C, and the high pressure water jet 53A is then expelled through nozzle opening 9B, as shown in FIG. 6C. Thus, the nozzle formed by the distance separating the first and second ends and the facing surfaces of the platform and the cover has advanced to a new location.

As the water pressure is repetitively cycled on and off, the nozzle automatically continues to advance in the manner described above, so that high pressure water ejected from the advancing nozzle cleans the bottom of the pool surrounding the cleaning head system.

The elastic ring 17 can, of course, be made from a variety of materials other than Delrin. For the Delrin material used in the described embodiment of the invention, it is advantageous that end 21 be substantially thinner than main body portion 19 of elastic ring 17. This makes end portion 21 considerably more flexible than main body portion 19, and causes the entire thin end portion 21 to more securely engage outer edge 27 as the water pressure in passage 35 is increased, preventing end 21 from slipping significantly in the clockwise direction as the remaining portions of elastic ring 17 are forced outward against edge 27 (and, of course, edge 27A) as the water pressure is increased.

Cylindrical base 3, platform 15, partitions 11, and tabs 5 can be formed as an integral injection molded part from various plastic materials, such as ABS plastic or PVC (polyvinyl chloride). Top 7 can be formed as a separate injection molded part. Thus, the entire cleaning head assembly 1 can be formed of only three parts: base and platform unit 3, 15, elastic ring 17, and top 7. The entire height of cleaning head assembly 1 need only be several inches. The device is highly reliable due to the simplicity of the device and due to the fact that there is only one moving part. It is not at all sensitive to the presence of debris, as is the previously described prior art.

The device can be made to any scale, so that small diameter units can be utilized to clean steps of swimming pools, and larger units can be utilized to clean the bottom surfaces of swimming pools. The described embodiment of the invention includes eighteen nozzle passages 9. The height of elastic ring 17 is approximately ¼", and the thickness of main body section 19 is approximately 50 to 60 mils. The thickness of end portion 25, as indicated by arrows 57 in FIG. 5 is approximately 20 to 25 mils. The diameter of the circle formed by outer edge 27 is 3.0 inches and the diameter of the circle formed by inside edge 29 is 2.48 inches. The length of elastic ring 17 is 9.048 inches, the gap between ends 23 and 21 when elastic ring 17 is in its expanded configuration is 0.532 inches. It should be noted, however, that the above dimensions and the various ratios therebetween are merely exemplary.

The contoured configuration of elastic strip 17 shown in FIG. 5 is best described with reference to axes B and H. The configuration is defined by drawing a portion of a circle having a radius of 1.5 inches from point A through an arc of 90° clockwise from point A to point C, the center being located at point D. Next, using a radius of one inch and a center at point E, an arc is drawn from point C to point K, point E being loiated 0.5 inches from point D. Finally, a radius of 0.89 inches is utilized to draw an arc from point K to point G, with a center located at point F. Point F is located 0.14 inches to the right of point E. Point G is located 15° counterclockwise from axis H.

Although the invention has been described with reference to a particular embodiment thereof, those skilled in the art can readily make various changes in structure and arrangement of parts without departing from the true spirit and scope of the invention. For example, outer edges 27 and/or the outer surface of a portion of end 21 can be slightly roughened or knurled to provide greater gripping, thereby preventing sliding of end 21 when water pressure is suddenly increased. Further, the disclosed device can be used for other applications then cleaning swimming pools without departing from the scope and spirit of the invention.

I claim:

1. Apparatus for producing a high velocity fluid stream in a plurality of radial directions, said apparatus comprising in combination:

a. a support element, said support element having an opening for receiving pressurized fluid, said support element having disposed therein a first annular groove around said opening, said annular groove having a first inner edge and a first outer edge;

b. a top element having disposed therein a second annular groove, said second annular groove having a second inner edge and a second outer edge, said top element being spaced from said support element;

c. an elastic strip loosely disposed between said first and second grooves, said elastic strip having a first end and a second end and having a relaxed configuration, said elastic strip being contoured so that in its relaxed configuration said first end presses against said inner edges and said second end presses against said outer edges, said elastic strip having a length such that pressurized fluid received through said opening presses both said first and second ends against said outer edges, thereby forming a nozzle opening between said first and second ends through which a high velocity fluid stream is ejected;

d. first means for engaging said first end along said inner edges when pressure of fluid in said opening is relieved, allowing said elastic strip to relax, said engaging of said first end and said relaxing in combination causing said second end to advance to a new position along said outer edges; and e. second means for engaging said second end along said outer edges when fluid in said opening is repressurized, said engaging of said second end and said repressurizing in combination causing said first edge to advance to a new position along said outer edges, whereby location of said nozzle opening is advanced to a new position.

2. The apparatus of claim 1 wherein the radii of said first and second inner edges are substantially equal and wherein the radii of said first and second outer edges are substantially equal, and wherein said first and second grooves are concentrically aligned.

3. The apparatus of claim 1 wherein said first means includes a plurality of spaced stops extending from said support element along said first inner edge and a tab attached to said first end of said elastic strip for engaging said stops to prevent slipping of said first end along said inner edges.

4. The apparatus of claim 3 wherein said second means includes a section of said second end of said elastic strip having a thickness substantially less than remaining portions of said elastic strip, said section being sufficiently flexible that said entire section is pressed against said outer edges when said elastic spring is relaxed between said annular grooves.

5. The apparatus of claim 4 wherein said elastic strip is made of acetal plastic material.

6. The apparatus of claim 1 wherein said elastic strip has varying radii curvature which decrease with distance from said second end of said elastic strip to said first end of said elastic strip.

7. The apparatus of claim 3 further including a plurality of partitions extending from said support element to said top element.

8. The apparatus of claim 7 wherein said top element is supported by said partitions and said spaced stops.

9. The apparatus of claim 1 further including a base integral with said support element and means for engaging said base into receptacles disposed in the bottom of a swimming pool, said receptacles being attached to a high pressure water source.

* * * * *